Nov. 4, 1952 G. B. WILLIAMS 2,616,838
DISTILLATION OF NITRILES
Filed Aug. 27, 1948 2 SHEETS—SHEET 1

FIG. I

INVENTOR
GEORGE BRYMER WILLIAMS
BY E. F. Liebrecht
Edmond F. Shanahan
ATTORNEYS

Nov. 4, 1952      G. B. WILLIAMS      2,616,838

DISTILLATION OF NITRILES

Filed Aug. 27, 1948

INVENTOR.
GEORGE BRYMER WILLIAMS
BY E. F. Liebrecht
Edmond F. Shanahan
ATTORNEYS Patented Nov. 4, 1952

2,616,838

UNITED STATES PATENT OFFICE 2,616,838

DISTILLATION OF NITRILES

George Brymer Williams, Ann Arbor, Mich., assignor to The M. W. Kellogg Co., Jersey City, N. J., a corporation of Delaware Application August 27, 1948, Serial No. 46,485

3 Claims. (Cl. 202—46)

This invention relates in general to the distillation of nitriles which involves direct reaction of fatty acids with ammonia. More particularly, it is concerned with an improved process in which the product nitriles are stripped with gaseous ammonia to separate the light and heavy nitriles.

The nitriles, RCN, are important chemical intermediates for the synthesis of a wide variety of compounds. In addition, several uses have been proposed for the high molecular weight aliphatic nitriles. Those containing from 10 to 14 carbon atoms inclusive are highly repellent to insects, and their use as agricultural insect repellents has been proposed. They impart the property of "oilness" to petroleum lubricants. It has been observed that mixtures of aliphatic nitriles function as penetrating oils and their use in motor fuels have been suggested. The reaction products of aliphatic nitriles with phosphorus pentasulfide or sulfur monochloride have been proposed as "extreme pressure" lubricants.

The lower molecular weight nitriles are effective flotation agents for certain metallic ores, and the dinitriles are also useful for this purpose. The use of nitriles as plasticizers for synthetic elastomers and various plastic materials is also possible. However, in general, it is the heavier nitriles which at present find the greatest use in industry and, in any commercial process for the production of nitriles, it is important to produce a maximum percentage of the heavier nitriles and, when the formation of lighter nitriles is inevitable, to separate the product into light and heavy fractions.

In the commercial manufacture of nitriles, one of the most important methods involves continuously contacting fatty acids with an excess of ammonia at temperatures of over 600° F.; conducting the products of this reaction, including unreacted fatty acids, nitriles, and excess ammonia through a series of catalyst converters for completion of the reaction; and stripping the nitrile product to separate light nitriles from heavy nitriles. In order to minimize the temperature at which the nitriles are separated, it is common practice to employ stripping gas. In the past, it has been the practice to carry out the stripping in the presence of steam as an inert stripping agent, and subsequently, to condense the steam and separate it from the light nitriles product. During the stripping, the nitriles are subjected to temperatures which tend to cause some reversal of the reaction which produced them:

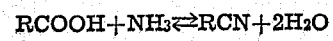

Even more important is the prevention of thermal decomposition or cracking of the heavier nitriles into less desirable nitriles at elevated temperatures.

It is an object of the present invention to reduce this tendency to decompose as far as possible and to avoid the necessity of separating condensation water. These and other objects of the invention are accomplished by stripping the nitrile products with ammonia instead of with steam. Two principal advantages result:

a. The presence of excess ammonia tends to prevent decomposition of the nitrile product.

b. The light nitriles are recovered without the necessity of separating condensed steam.

The uncondensed vapors from the fractionator are comprised principally of ammonia, but this is readily recovered in the ammonia recovery system which is required as a part of the first step in the nitriles manufacture process.

The invention may be employed in a commercial installation as illustrated in the accompanying drawings in which.

Figure 1:
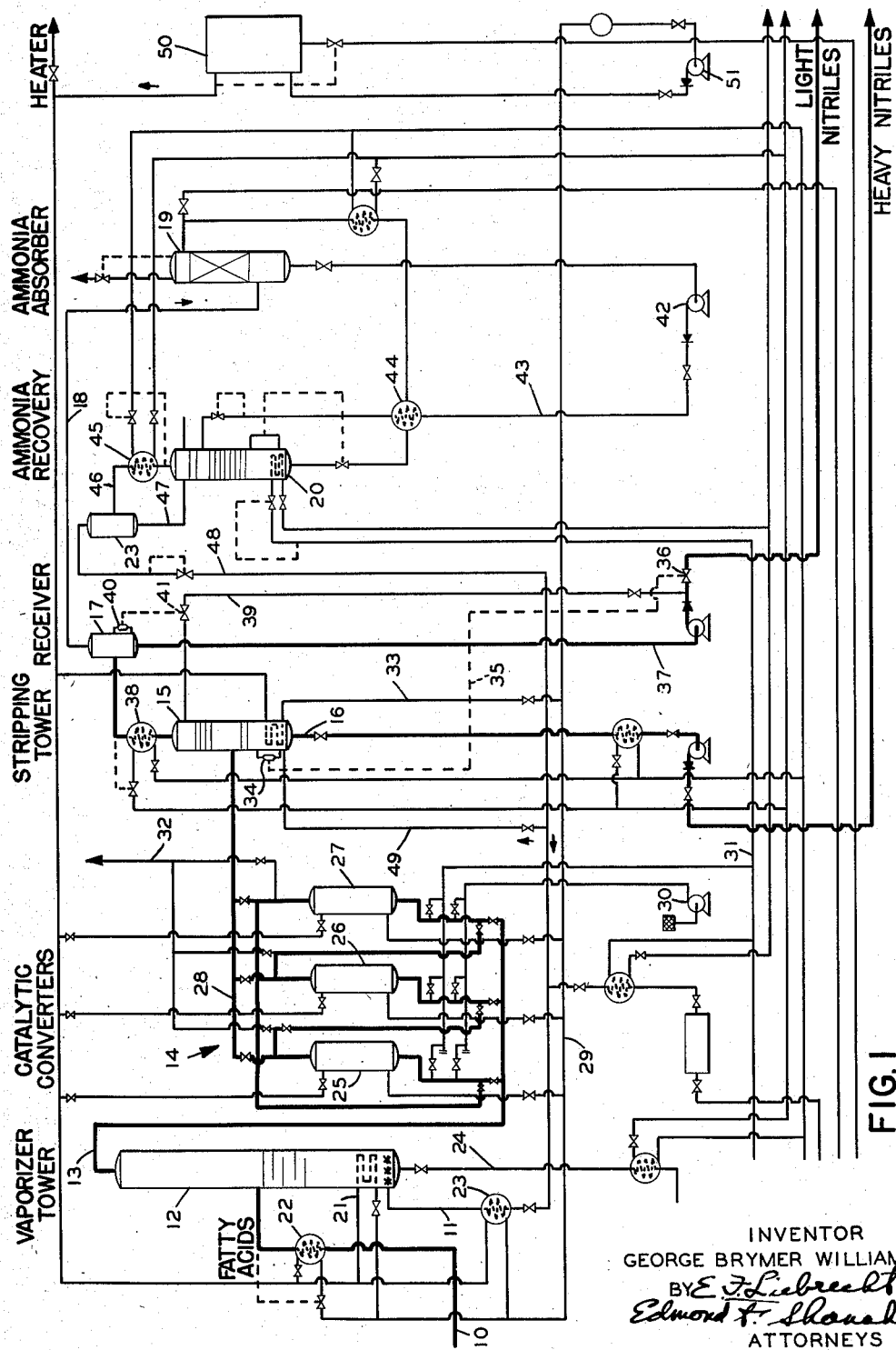
Figure 1 is a flow sheet for a nitrile manufacturing plant.

In Figure 1, fatty acids are introduced into the system through line 10 and are contacted with ammonia, introduced through line 11, in a vaporizer tower 12. About one-half of the reaction occurs in tower 12. A gaseous mixture of reaction products and unreacted materials leave the top of tower 12 through line 13 and passed through a series of catalytic converters indicated generally by arrow 14. After completion of the reaction in catalytic converters 14, the product nitriles are fractionated in stripping tower 15, the bulk of the product being withdrawn in the form of heavy nitriles through line 16, light nitriles, and uncondensed vapors being diverted to a receiver 17 in which condensed nitriles are collected. The remaining vapor passes through line 18 to an ammonia absorber 19, in which they are scrubbed with water to remove unreacted ammonia. The dilute ammonia solution so formed is heated and distilled in a bubble cap tower 20, to recover the ammonia and return it to the system.

The above description lists the principal components of the flow diagram. The remainder of the diagram will now be explained in detail, In order that the piping system may be more easily followed, the diagram of the nitriles plant, the pipe lines which contain fatty acids or reaction products are shown in heavier weight than the rest of the system. Heat for tower 12 is supplied through heating coil 21 and by heating the fatty acids and the ammonia in preheaters 22 and 23 respectively. Tower 12 is similar in construction to a bubble tray tower except that a considerable amount of holding time is required in the bottom heating or reboiler zone. This holding time is at the high temperatures required by the reaction. Unreacted bottoms containing heavy or polymerized material and comprising about one-tenth of the feed are withdrawn either continuously or intermittently through bottom draw-off line 24 and stored for further processing in a pitch still not shown.

In the catalytic converter section 14, three converter tanks 25, 26, and 27 are employed, together with a piping system indicated generally by the numeral 28 so that the intermediate reaction product from tower 12 may be passed through any one of the converters 25, 26, and 27 by manipulation of the valves and piping system 28. The converters are heated by Dowtherm circulated through lines 29. The multiplicity of catalytic converters is necessary in order that one of the converters may be regenerated while the other two are in use. By rotation of the converters, the system may be operated continuously without shut-down for regeneration.

During reaction cracking of the nitriles occurs to some extent and the coke formed must be burned off periodically. In a normal cycle for a plant of this type each converter is reacting for six days, three as the second reactor and three as the lead reactor. Then it is off stream for a three day period in which time it is regenerated. A small blower 30 supplies air for combustion; steam is supplied from steam line 31 to control regeneration temperature and for purging. When a converter is being regenerated flue gas must be exhausted from its upper end; piping system 32 is provided for this purpose.

In stripping tower 15, the gaseous products of reaction are condensed and stripped so as to remove a cut which contains low boiling nitriles as distillate; this overhead cut is approximately five per cent. Heat required for stripping in tower 15 is supplied from Dowtherm line 33. Liquid level controller 34 maintains a constant level in tower 15 by remotely controlling through remote control line 35, a valve 36, which controls the rate at which light nitriles are discharged from receiver 17 through line 37. Overhead vapors from stripping tower 15 are cooled by heat exchanger 38 so that the light nitriles can be readily collected in receiver 17. The liquid level of light nitriles in receiver 17 remotely controls the refluxing of tower 15 through reflux line 39 by means of liquid level control 40 and controlled valve 41.

Figure 2:
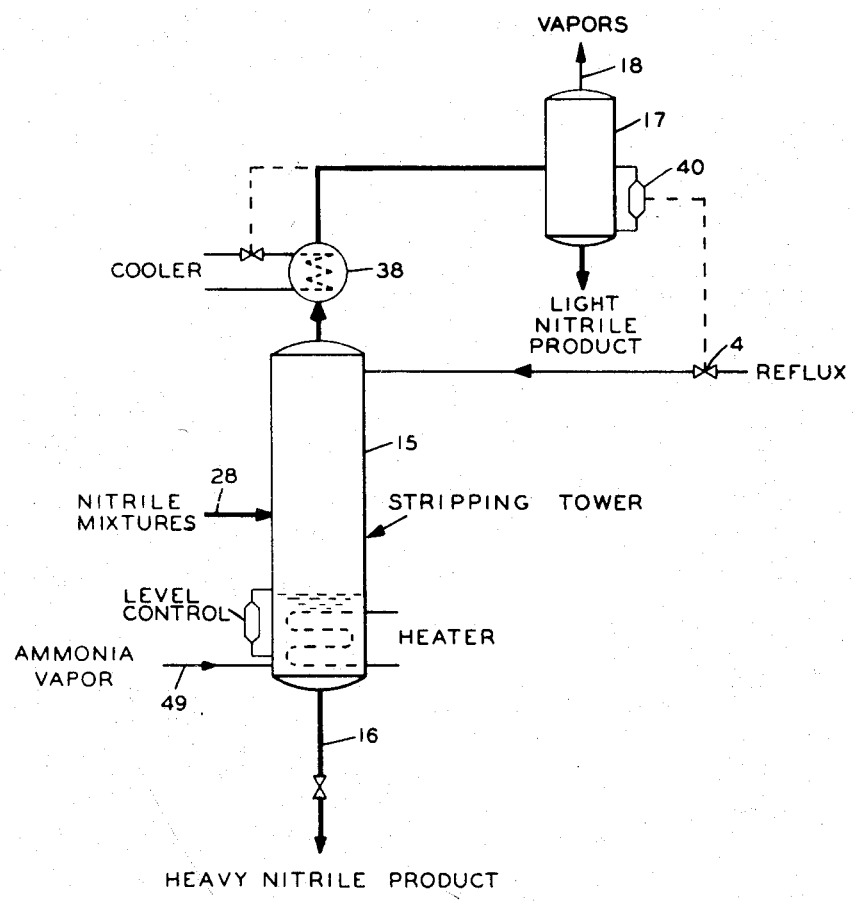
Figure 2 is an enlarged drawing of stripping tower 15 in which the nitrile mixture is stripped with ammonia vapor as it is fractionated into light and heavy nitrile products.

The important feature of the present invention is that ammonia is bubbled through the liquid nitrile product in the bottom of tower 15 (See Fig. 2). The temperature of the stripping should be at the minimum at which the light nitrile impurities can be satisfactorily vaporized. Although the volume of ammonia required will depend to some extent on the purity of the product obtained and the temperature of stripping, it is a preferred method to carry out the stripping with a volume of ammonia which is at least half the volume of the gaseous reaction product and is not greater than twice the volume of the gaseous reaction product. The fractionation of the nitrile product into light and heavy products will of course depend to some extent on the light and heavy fractions desired. It is preferred, in the present method of operation, to separate a light fraction including all the nitriles having less than 12 carbon atoms.

As described above, the vapor overhead from receiver 17 is scrubbed in scrubber 19 to obtain a dilute solution of ammonia and water which is pumped by pump 42 through line 43 to heater 44 to ammonia and recovery fractionator 20. The overhead vapors from fractionator 20 are cooled by cooler 45 and passed to a receiver 46. Liquid from receiver 46 is returned to fractionator 20 via line 47. Ammonia vapor from receiver 46 passes through line 48 and line 11 to contact fatty acid in a vaporizer 12. The method of the present invention may be practiced by withdrawing some of the ammonia from line 48 through line 49 to serve as stripping gas in stripping tower 15.

The Dowtherm circulated through the system via Dowtherm circulating pipe 29 is heated by means of heater 50 and is pumped by means of pump 51 in the conventional manner. Heat exchangers are provided at appropriate points for recovering heat which would be otherwise lost to the system by the discharge of reaction products.

I claim:

1. In the process of manufacturing nitriles by the reaction of fatty acids with ammonia, in which the reaction products are fractionated in a vertically extended fractionation zone to condense in the bottom of said zone a heavy fraction containing substantially all of the heavy nitriles and to recover a vapor fraction containing light nitriles and ammonia, the improvement which consists in introducing gaseous ammonia upwardly through said heavy nitrile fraction to strip therefrom light nitriles and other low-boiling impurities.

2. The process as described in claim 1 in which said light fraction includes all the nitriles having less than 12 carbon atoms.

3. A method as described in claim 1 in which fractionation of said reaction products is carried out in the presence of a volume of ammonia not less than ½ the volume of the gaseous reaction product and not greater than two times said volume.

GEORGE BRYMER WILLIAMS.

REFERENCES CITED

The following references are of record in the file of this patent:

UNITED STATES PATENTS

| Number | Name | Date |
|---|---|---|
| 2,314,894 | Potts | Mar. 30, 1943 |
| 2,448,275 | Potts | Aug. 31, 1948 |